Figure 1:
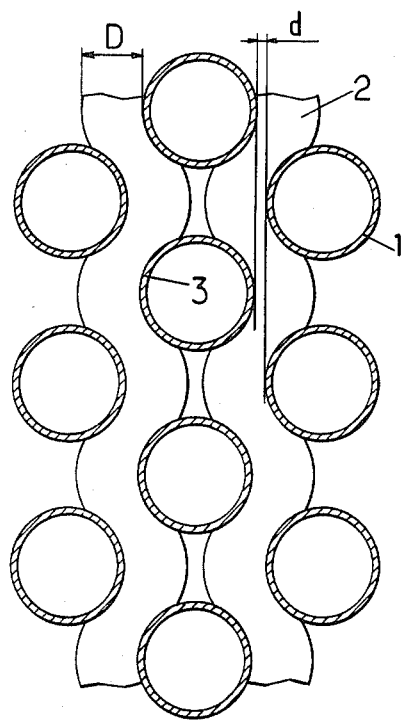

United States Patent [19]

Bizard

[11] Patent Number: 4,702,311
[45] Date of Patent: Oct. 27, 1987

[54] METHODS AND DEVICES FOR FASTENING BUNDLES OF TUBES TOGETHER

[75] Inventor: Andre Bizard, Paris, France
[73] Assignee: Technos et Compagnie, Paris, France
[21] Appl. No.: 857,225
[22] Filed: Apr. 29, 1986

[30] Foreign Application Priority Data

May 3, 1985 [FR] France ............................... 85 06774

[51] Int. Cl.$^4$ ............................................. F28D 7/00
[52] U.S. Cl. ..................................... 165/162; 165/905
[58] Field of Search ................................ 165/162, 905

[56] References Cited

U.S. PATENT DOCUMENTS

| 3,720,259 | 3/1973 | Fritz et al. | 165/162 |
| 3,864,811 | 2/1975 | Walker | 165/162 X |
| 4,204,570 | 5/1980 | Eisinger | 165/162 X |

FOREIGN PATENT DOCUMENTS 1188564  10/1968  United Kingdom ................ 165/162

Primary Examiner—Albert W. Davis, Jr.
Assistant Examiner—Peggy A. Neils
Attorney, Agent, or Firm—Townsend and Townsend

[57] ABSTRACT

For assembling together a bundle of parallel tubes (1) recourse is had to flexible and sealed pipes (2) inserted jointingly between the successive layers of these tubes, said pipes having sufficient elasticity for being successively flattened by evacuation of their inner volume, which allows positioning thereof in the bundle, then resuming their initial tubular shape by suppression of the vacuum, and said pipes are made from a partially crystalline plastic material, such as a polyamide 11, which allows them to be positioned in the bundle by simply pushing from their portion not engaged in the bundle.

4 Claims, 3 Drawing Figures

U.S. Patent  Oct. 27, 1987  4,702,311

METHODS AND DEVICES FOR FASTENING BUNDLES OF TUBES TOGETHER

The invention relates to the fastening together of bundles of parallel tubes, that is to say to the methods and devices for assembling together the parallel tubes of this bundle while damping vibration thereof, the bundles in question forming more particularly heat exchangers or condensers.

It relates more particularly, among these methods and devices, to those in which the tubes are fastened together, at least partially, by means of flexible and sealed pipes interposed jointingly between the successive layers of such tubes, in directions slanting generally through 90° with respect to those of said tubes, the positioning of each pipe being effected by the longitudinal introduction thereof between the layers to be kept close together after it has been temporarily flattened by evacuating its inner volume.

The pipes considered must have the following properties:

they must withstand the temperature and the chemical attack of the fluids which flow outside the tubes, and in particular hot water and products for conditioning such water, such as ammonia hydrazine and morpholine, for the preferred applications mentioned above, they must have sufficient resilience so as to be able to resume their initial tubular shape after positioning in the bundle to be fastened together and after suppression of the vacuum therein.

In known embodiments, the material forming said pipes is generally butyl rubber or another elastomer.

Recourse to these materials raises certain problems:

in their flattened state, the corresponding pipes are too flexible and often too thick, particularly in their marginal fold zones or "commissures", to be positioned in the tubular bundle to be fastened together by simply pushing: positioning thereof involves a pull exerted by means of a metal grip on their front end, i.e. introduced first into the bundle of tubes; the disadvantages due to the use of such grips are numerous and manifest, particularly in so far as the risk of damaging the tubes is concerned, the need to provide a relatively large space between the tubes for allowing the passage of the grips therebetween . . .

the tubes in question tend to rapidly resume their initial shape after suppression of the vacuum; since it is scarcely possible in practice to provide such suppression simultaneously in all the pipes in position, expansion of these pipes takes place successively in time, which results finally in an irregular distribution of the tubes in the bundle, those which have the first expanded pipes closely embracing them being the furthest away from their neighbours, some of the pipes in question are not weldable so that the closure at least temporary of one at least of their ends requires the use of expensive means of disputable efficiency.

The invention overcomes simultaneously all these disadvantages.

For this, the assembly pipes of the kind in question are essentially characterized, in accordance with the invention, in that they are made from a material with polymer structure having, in addition to the above described characteristics, a degree of crystallinity between 5 and 40% and a vitreous transition point less than or equal to 100° C.

The polymer materials thus defined have the following advantages, which all prove to be extremely precious in the contemplated application: delayed elastic response, possibility of thin wall extrusion, heat weldability and especially axial rigidity of the corresponding pipes in their flattened state, which allows them to be positioned in this flattened state in the bundle of tubes by simple "rear" pushing, i.e. from their portion not engaged in the bundle.

As material complying with all these conditions, there may be mentioned polyamides such as polyamides 11 and 12, and copolyamides, more particularly the N-alkylated copolyamides.

The assembly method of the invention is essentially characterized in that the pipes in their flattened state are positioned in the bundle of tubes by rear pushing.

The invention comprises, apart from these main arrangements, certain other arrangements which are used preferably at the same time and which will be more explicitly discussed hereafter.

In what follows, preferred embodiments of the invention will be described with reference to the accompanying drawings in a way which is of course in no wise limitative.

Figure 2:
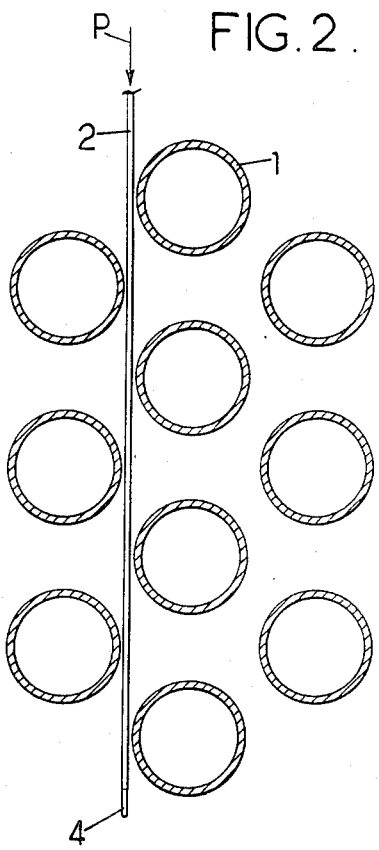
Figure 3:
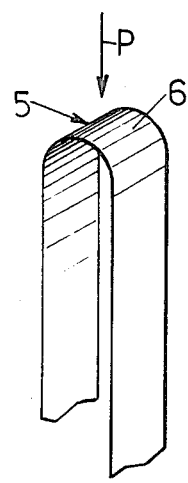

FIG. 1, of these drawings, shows in cross section a portion of a tube bundle assembled in accordance with the invention, FIG. 2 shows similarly the same portion during fitting of an assembly pipe, FIG. 3 shows the form which it is possible to give to the assembly of two such parallel assembly pipes before fitting thereof into the bundle of tubes to be assembled together.

The bundle of tubes to be assembled together is formed of parallel metal tubes 1 which may have any desirable orientation and distribution, being for example horizontal and distributed in a grid arrangement of horizontal lines and vertical columns intersecting at right angles.

In the embodiment shown, these tubes are again horizontal, but distributed in a staggered arrangement, the parallel layers of tubes then extending in directions slanted through 45° with respect to the horizontal and intersecting each other.

The flexible assembly pipes 2 are interposed jointingly between some at least of said layers of tubes.

Each pipe 2 has an external diameter D greater than the distance d separating the two layers of tubes 1 spaced apart by this tube and jointingly hugged thereby.

It is essentially to the construction and positioning of pipes 2 that the present invention relates.

As in the known embodiments recalled above:

these pipes 2 must be able to be flattened by evacuating their inner volume, so as to make it possible to insert them longitudinally between the layers of tubes 1 to be assembled together, and the subsequent suppression of the vacuum inside these pipes after positioning thereof in the bundle must result automatically in swelling thereof or in the elastic return to their initial form of revolution, which swelling applies them laterally with firmness and flexibility against tubes 1, as can be seen at 3 in FIG. 1, furthermore, the material forming pipes 2 must be thermally and chemically resistant to the fluids with which it is intended to come into contact.

But instead of choosing for said material an amorphous elastomer material whose elastic response is practically instantaneous, as in known embodiments, here it is formed by a material of polymer structure having a degree of crystallinity between 5 and 40%.

In other words, the material considered is no longer 100% amorphous but simply to a degree between 60 and 95%.

It will be recalled that a substance is said to have a degree of crystallinity of n% when its volume comprises a fraction n% of crystalline structure, i.e. ordered and periodic in the three spatial directions: only the structure of the complementary fraction, equal to $(100-n)\%$ of the total volume is amorphous, that is say disordered and aperiodic in space.

In addition, the polymer material considered must further have a vitreous transition point less than or equal to 100° C., preferably less than 20° C.

Such a material is for example one of those mentioned above.

As homopolymers may be mentioned polyamides 11 and 12 such as those commercialized under the commercial name RILSAN by the firm ATO CHEM, which are about 25% crystalline and have without additional plasticizer a vitreous transition point of about 50° C.

As copolymers may be mentioned the N-alkylated copolyamides such as the copolymers of aminoacid 11 and of N heptyl aminoacid 11 called RILSAN copolymer 8020 and 6733 produced by the firm ATO CHEM, which have respectively vitreous transition points of 35° C. and 15° C., or else the amide block polyether sold under the name PEBAX by said firm and which is about 15% crystalline.

The applicant has discovered that the above defined materials fulfil simultaneously a certain number of conditions which are surprisingly particularly advantageous in the application considered here, and in particular the following.

In the first hand, the elastic response of these materials—which is total, but only when the temperature is higher than the vitreous transition point—is slow instead of being immediate, in that, after being deformed mechanically, they elastically resume their initial shape with a certain delay after removal of the force which created the deformation, this delay being for example of the order of several hours.

The slowness of such resumption makes a homogeneous distribution of the swelling of the different pipes possible after positioning thereof in the tube bundle to be assembled—and possibly first subsequent heating thereof, for example by causing a hot fluid to flow between the tubes—even if suppression of the vacuum in the whole of these pipes is spread out in time.

In the second place, the above defined polymer materials lend themselves to thin wall extrusion in that it is possible to form pipes with them having a thin wall, for example of a thickness equal to 0.5 mm or even smaller.

One consequence of these two preceding properties is that it is possible to give to the pipes considered, in their flattened state, an extremely flat and thin shape corresponding to substantially total crushing of their two marginal fold zones or "commissures", the pipes thus flattened then being in the form of flat thin ribbons comparable to metal strips or foils and having, like these, good longitudinal rigidity and a relatively low friction coefficient with metals.

This possibility makes it possible to insert pipes 2 inside the bundle of tubes 1 to be assembled together by simply pushing their portion not yet engaged in the bundle, as shown schematically by the arrow P in FIG. 2.

Such positioning of the pipes within the tube bundle by simple "rear" pushing is much simpler than known positioning operations, which involve a pull exerted on the front end of each pipe by means of a pulling grip.

Furthermore, the above defined polymer materials are readily thermoweldable.

This latter quality allows the front end 4 (FIG. 2) of each pipe 2 to be sealed off, that is to say its end introduced first into the bundle of tubes 1, by simply nipping this end between the two heated jaws of an appropriate clamp.

This sealing process is both much simpler and much more efficient than the other known sealing procedures requiring bonding, sewing, bending, etc. . . .

It may be added that the polymer material mentioned more explicitly above has the further advantage of being free of sulphur and chlorine, which is required for some applications such as the assembly together of condensers used in some nuclear power stations.

It should be noted that it had never been contemplated before the invention to use the whole of the above described properties of the plastic materials considered, which served essentially for forming fluid transport pipes, such for example as compressed air supply sheaths for truck brakes.

FIG. 3 shows the hair pin shape 5 which it is possible to give to a flattened pipe in accordance with the invention before inserting the two legs thereof into a bundle of tubes to be assembled together, on each side of the same layer of this bundle.

The thrust P may then be exerted on the U shaped external bulging face of base 6 of pin 5 and the vacuum may be released in the two legs after the pin has been inserted in the tube bundle by simply perforating said base 6.

In an interesting variant, assembly of the bundle is achieved by zig zag lacing, each pipe after positioning extending in a succession of parallel sections extending between different layers of the bundle, which sections are joined together by 180° bends external to the bundle, guide and drive means being provided at the level of each bend for gripping the downstream end of each section, bending it through 180° and pushing it back into the next parallel section.

In a preferred embodiment which has given every satisfaction and is given here solely by way of illustration, tubes 1, forming a condenser for a nuclear power station, were made from titanium and had an external diameter of 19 mm and a thickness of 0.7 mm and the flexible type pipes 2 were made from the above plastic material called RILSAN and had an external diameter of 15 mm and a thickness of 0.5 mm.

Following which, and whatever the embodiment adopted, methods and devices are finally obtained for assembling bundles of tubes together whose use and advantages are clear from the foregoing.

As is evident, and as it follows moreover already from what has gone before, the invention is in no wise limited to those of its modes of application and embodiments which have been more especially considered; it embraces, on the contrary, all variants thereof.

What is claimed:

1. A device for assembling together a bundle of parallel tubes (1), comprising flexible sealed pipes (2) inserted jointingly between the successive layers of these tubes, said pipes having sufficient elasticity for being successively flattened by evacuation of their inner volume, which allows positioning thereof in the bundle, then resuming their initial tubular shape by suppression of the vacuum, characterized in that they are made from a polymer material having a degree of crystallinity between 5 and 40% and a vitreous transition point less than or equal to 100° C.

2. The assembly device according to claim 1, characterized in that the polymer material is a polyamide or copolyamide.

3. The assembly device according to claim 2, characterized in that the polymer material is a polyamide 11 or 12.

4. The assembly device according to claim 2, characterized in that the polymer material is an N-alkylated copolyamide.

* * * * *